United States Patent
Spillner et al.

(10) Patent No.: US 6,195,601 B1
(45) Date of Patent: Feb. 27, 2001

(54) METHOD FOR CONTROLLING THE VALVE CHARACTERISTIC

(75) Inventors: Robert Spillner, Düsseldorf; Mathias Seidel, Neuss, both of (DE)

(73) Assignee: TRW Fabrwerksysteme GmbH & Co. KG, Dusseldorf (DE)

( * ) Notice: Subject to any disclaimer, the term of this patent is extended or adjusted under 35 U.S.C. 154(b) by 0 days.

(21) Appl. No.: 09/290,294

(22) Filed: Apr. 13, 1999

(30) Foreign Application Priority Data

May 7, 1998 (DE) .............................................. 198 20 381

(51) Int. Cl.$^7$ ...................................................... B62D 5/00
(52) U.S. Cl. ............................................... 701/41; 180/422
(58) Field of Search ...................... 701/41, 42; 180/441, 180/417, 422

(56) References Cited

U.S. PATENT DOCUMENTS

| | | | |
|---|---|---|---|
| 4,626,994 | * 12/1986 | Yabe et al. | 701/41 |
| 4,627,509 | * 12/1986 | Adams et al. | 180/422 |
| 4,693,332 | * 9/1987 | Miyata et al. | 180/422 |
| 4,884,648 | * 12/1989 | Uchida et al. | 180/422 |
| 5,029,660 | * 7/1991 | Raad et al. | 180/422 |
| 5,122,958 | * 6/1992 | Eto et al. | 701/41 |
| 5,208,752 | * 5/1993 | Kodama et al. | 701/41 |
| 5,307,892 | * 5/1994 | Phillips | 180/422 |
| 5,467,281 | * 11/1995 | Iwashita et al. | 701/41 |
| 5,553,683 | * 9/1996 | Wenzel et al. | 180/417 |
| 5,698,956 | * 12/1997 | Nishino et al. | 318/432 |
| 5,749,431 | * 5/1998 | Peterson | 180/422 |
| 5,761,627 | * 6/1998 | Seidel et al. | 701/41 |
| 5,762,159 | * 6/1998 | Matsuoka et al. | 180/422 |
| 5,786,674 | * 7/1998 | Kress et al. | 318/268 |
| 5,787,376 | * 7/1998 | Nishino et al. | 701/41 |
| 5,839,537 | * 11/1998 | Nishino et al. | 180/443 |
| 5,904,222 | * 5/1999 | Liubakka et al. | 180/422 |
| 5,967,253 | * 10/1999 | Collier-Hallman | 180/421 |

FOREIGN PATENT DOCUMENTS

| | | |
|---|---|---|
| 3424826 | 4/1992 | (DE) . |
| 3309214 | 7/1993 | (DE) . |
| 4241785 | 6/1994 | (DE) . |
| 4420309 | 12/1995 | (DE) . |
| 196 23 567 | 12/1997 | (DE) . |
| WO9511152 | 4/1995 | (WO) . |

* cited by examiner

Primary Examiner—Michael J. Zanelli
Assistant Examiner—Eric M Gibson
(74) Attorney, Agent, or Firm—Tarolli, Sundheim, Covell, Tummino & Szabo L.L.P.

(57) ABSTRACT

To improve a method for controlling the valve characteristic in electrohydraulic power-assisted steering systems of motor vehicles so as to prevent any impairment of the steering precision, the invention proposes to control the speed of the electric motor as a function of the current consumption such that the actual current consumption and the actual speed of the electric motor are continuously measured up to a maximum speed and compared with values for the setpoint speed at the respective value of the current consumption stored in a memory and in case of deviation a correction to the setpoint speed is effected.

9 Claims, 1 Drawing Sheet

METHOD FOR CONTROLLING THE VALVE CHARACTERISTIC

TECHNICAL FIELD

The present invention relates to a method for controlling the valve characteristic of a motor vehicle's power assisted steering system driven by an electric motor and hydraulic pump as a function of the current consumption of the electric motor.

BACKGROUND OF THE INVENTION

Electrohydraulic power-assisted steering systems of the generic class are well known. A servo steering valve is directly or indirectly coupled with a vehicle steering wheel and put under hydraulic pressure. On torsion, the hydraulic pressure is guided to one or the other side of a steering gear and provides steering power assistance. The hydraulic pressure is produced by a hydraulic pump, which is driven by an electric motor.

In principle, it is desirable in power-assisted steering systems to adjust the steering behavior as a function of the vehicle speed. Prior art describes methods and devices for selectively controlling the steering behavior of power-assisted steering systems. For example, methods are known for controlling the valve characteristic as a function of the steering rate in that the volumetric flow of the hydraulic pump to the steering valve is selectively varied. The reduced volumetric flow can be adjusted, for example, by an interior bypass valve that opens a bypass from the delivery side to the return flow side with increasing speed of the hydraulic pump.

For power-assisted steering systems of the aforementioned type the course of the servo assistance has a narrow valve characteristic for high volumetric flow rates. The driver then finds the power-assisted steering easy. At smaller volumetric flow rates, servo assistance is reduced and the driver finds the steering stiff.

Varying the displaced volume in order to control the valve characteristic is very simple to implement in electrohydraulic power-assisted steering systems. Changing the motor speed also changes the speed of the hydraulic pump, which at low speeds provides low and at high speeds high volumetric flow rates.

The speed of electric motors is changed simply by changing the input voltage. At constant vehicle voltage, for example, in the automobile industry, the motor speed is adjusted by pulse width modulation. Pulse width modulation produces small current pulses, whereby the length of the current pulses defines the motor speed.

Control systems of the described generic class are a more economical alternative to the control of valve characteristics. The driver, however, perceives the increase in the response threshold as a disadvantage. The response threshold defines the amount of torque at which servo assistance begins. This response threshold, also referred to as dead band, increases with smaller volumetric flow and thus impairs the steering precision of the steering assembly. Within the dead band, the driver is steering without any servo assistance only via the elastic torque rod. This decisively impairs the steering precision of the steering assembly. Desirable is a characteristic like the one known, for example, in hydraulic reaction systems, since the dead band of the valve characteristics in these power-assisted steering systems is kept approximately constant.

For example, in steering systems with hydraulic reaction, the steering characteristic of the steering valve is typically controlled by returning the existing operating pressure to a hydraulic-mechanical converter in the steering valve. Such steering assemblies advantageously exhibit a linear increase in servo assistance as a function of the input torque applied by the driver.

Furthermore, using an electrohydraulic converter makes it possible to set a speed-dependent valve characteristic. Such power-assisted steering systems are distinguished by light servo assistance at high speeds. Due to an increase in torsional rigidity, i.e. reduced relative torsion of the steering edges at a given torque, produced by the hydraulic-mechanical converter, the driver perceives steering stiffness. In the parking range, however, the driver finds steering advantageously easy.

The disadvantage of such steering assemblies with hydraulic reaction is their increased price compared to conventional power-assisted steering due to the required additional components such as the electrohydraulic converter, which is controlled by an electric control unit ECU. In addition, the steering valve design becomes more complex and expensive due to the hydraulic-mechanical converter. The economical standard valve of a conventional assisted-power steering system can no longer be used.

Based on the described prior art, the object of the present invention is to define a method that provides an economical way to control the valve characteristic in electrohydraulic power-assisted steering systems without impairing steering precision.

SUMMARY OF THE INVENTION

To attain this object, the invention proposes continuously to measure the actual current consumption and the actual speed of the electric motor up to a maximum speed and to compare these values with the values for the setpoint speed for the respective current consumption stored in a memory and in case of deviation to correct to the setpoint speed.

The method according to the invention is highly flexible since selecting the course of the setpoint speed over the current consumption makes it possible to set nearly all the most common valve characteristics following a minor adjustment of the control edges. The elimination of the components required for electrohydraulic and hydraulic-mechanical converters furthermore provides significant space and cost savings.

According to one proposal of the invention, the values for the setpoint speeds and the current consumption are stored in an electronic memory.

Servo assistance and the valve characteristic are dependent on the respective volumetric flow of the hydraulic pump at any rotation of the steering valve. The delivered volumetric flow results from the speed of the hydraulic pump, which corresponds to the driving speed of the motor. If the driver turns the steering valve, the pressure increases, which causes the current consumption of the motor to increase. The current consumption is determined by the ECU, for example, via the voltage drop of a resistor.

The characteristic of an electric motor typically shows a non-controlled constant or falling course of the speed over the driving torque. The driving torque and the current consumption of the electric motor thereby increase approximately proportionally with the hydraulic pressure delivered by the hydraulic pump. This relation results in a constant or falling course of the speed of the electric motor as a function of the hydraulic pressure.

The method according to the invention describes a speed control as a function of the current consumption of the electric motor such that the actual current consumption and the actual speed of the electric motor are continuously measured up to a maximum speed and compared with the values for the setpoint speed at the respective value of the current consumption stored in a memory and in case of deviation a correction to the setpoint speed is effected.

According to a further proposal of the invention, the speed of the electric motor is changed by a pulse width modulation process.

According to another proposal of the invention, the speed of the electric motor is controlled incrementally.

Through speed control and selection of the setpoint speeds, additional speed characteristics of the electric motor beyond prior art can be represented as a function of the driving torque, which makes it possible selectively to control the valve characteristic. The setpoint speed is selected based on a calculation of the deviation of an actual valve characteristic, which is established without speed control, compared to a setpoint valve characteristic.

For each rotation of the steering valve there is a restrictor cross section, which produces a defined hydraulic pressure at a given volumetric flow, i.e. at a given speed of the electric motor. The difference of the hydraulic pressures of an actual valve characteristic and a setpoint valve characteristic at any rotation of the steering valve thus defines the volumetric flow required in order to set the setpoint valve characteristic at identical rotation. The respective setpoint speed can then be calculated from the volumetric flow.

According to a further proposal of the invention, the values for the setpoint speed are determined in such a way that the valve characteristic of a steering valve is at least partially linearized.

According to a further proposal of the invention, the values for the setpoint speed and the current consumption are read into the electronic memory during operation of the power-assisted steering system.

According to a further proposal of the invention the speed of the electric motor is corrected when the characteristic of the steering valve and/or the servo force of a power-assisted steering system falls outside predefined tolerance limits.

In the production of steering valves, very high tolerance requirements result in relatively high reject rates, which causes high quality costs for rework. Steering valves that fall only slightly outside the tolerance limits have, for example, a steering characteristic that is either slightly too stiff or too easy or they exhibit asymmetries. The characteristic of such steering valves can be positively affected by speed control, for example, during the typical final functional tests of the power-assisted steering system. Based on a deviation of the valve characteristic and/or the servo force of a power-assisted steering system, the setpoint speed at the respective current consumption value is calculated and the actual speed correspondingly corrected such that the original deviations of the valve characteristic and/or the servo force fall within the tolerance limits.

According to a further proposal of the invention, a steering angle sensor is used to detect the direction of rotation to compensate asymmetries of the valve characteristic created during production by selection of a setpoint speed during steering to the right or left.

According to a further proposal of the invention, the values for the setpoint speed are determined to effect a specific correction of the position of the valve characteristic at different oil temperatures and/or based on age-related valve changes.

According to a further proposal of the invention, the values for the setpoint speed are determined such that the value of the torque at which servo assistance begins can be set.

According to a further proposal of the invention, the traveling speed is measured in addition to the current consumption and the actual speed and is continuously compared with the setpoint speed values at the respective traveling speed and current consumption stored in a memory in order to effect a correction to the setpoint speed in case of any deviation.

According to a further proposal of the invention, the values for the setpoint speed are determined in such a way that the valve characteristic of a steering valve has a speed dependent course.

Thus, the method proposed here makes it possible to control the valve characteristic cost effectively and at the same time to reduce the quality costs. The method provides the greatest possible independence of the system from the tolerances of the individual components.

BRIEF DESCRIPTION OF THE DRAWINGS

Further advantages and features of the invention result from the following description by means of the figures, wherein.

DETAILED DESCRIPTION OF THE PREFERRED EMBODIMENT

Figure 2:
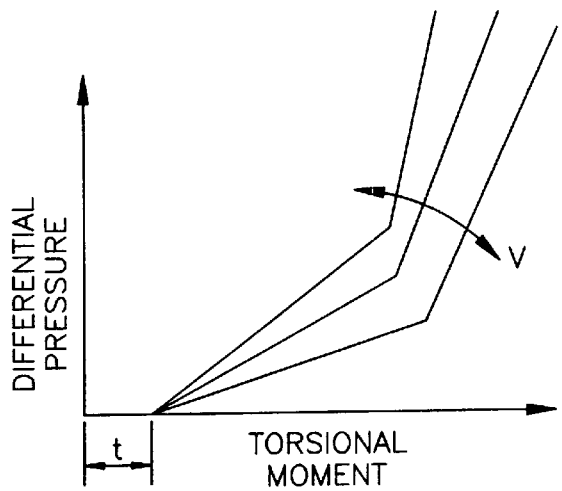
FIG. 2 shows a differential pressure/torque diagram of a steering assembly with hydraulic reaction.
Figure 3:
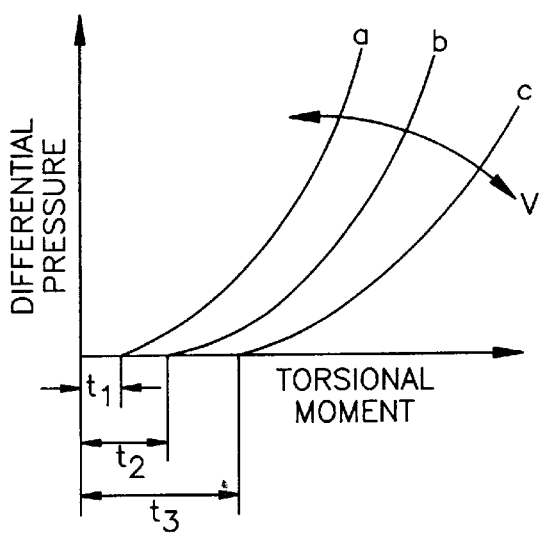
FIG. 3 shows a differential pressure/torque diagram of a steering assembly with variable volumetric flow.

FIG. 2 shows the course of the valve characteristic of a power-assisted steering system with hydraulic reaction as a function of the traveling speed. The dead band t is nearly constant in such power-assisted steering systems and the valve characteristic has a linear course. FIG. 3 shows the course of the valve characteristic of a power-assisted steering system with variable volumetric flow as a function of the traveling speed. The dead band $t_1$, $t_2$, or $t_3$ increases with falling volumetric flow.

Figure 1:
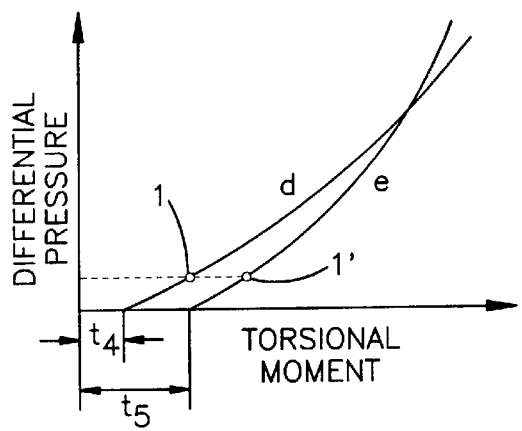
FIG. 1 shows a differential pressure/torque diagram of a steering assembly with controlled characteristic.

The underlying speed control will be further explained by way of example based on FIG. 1. FIG. 1 shows the course of two valve characteristics. Characteristic (e) represents the actual valve characteristic of a steering valve of a conventional power-assisted steering system for constant volumetric flow, i.e. constant pump and motor speed. Valve characteristic (d) is the desired setpoint valve characteristic. At the start of a steering process, the steering valve is in neutral position 0 and the differential pressure is nearly zero. A rotation of the steering valve slightly increases the differential pressure and thus the delivery pressure of the hydraulic pump, which in the electric motor produces a change in the current consumption and an actual motor speed. In the electronic memory of the ECU, value pairs for current consumption and the setpoint speed of the electric motor are stored. After the measurement of the current consumption, the ECU executes a setpoint/actual value comparison and then corrects the motor speed to the setpoint. Positions 1 and 1' in FIG. 1 show the difference of the two characteristics at relatively low hydraulic pressure. Characteristic (d) shows an earlier engagement of the assisted-power steering system and thus a smaller dead band compared to characteristic (e). The setpoint/actual value comparison is continuously executed up to the maximum speed of the motor. The maximum speed is the limit speed that is established based on a predefined load of the uncontrolled electric motor.

A comparison of the two characteristics clearly shows the advantages of the proposed method for controlling the speed of the motor as a function of the current consumption. The dead band of the valve characteristic can be specifically reduced when controlling the motor speed.

Figure 4:
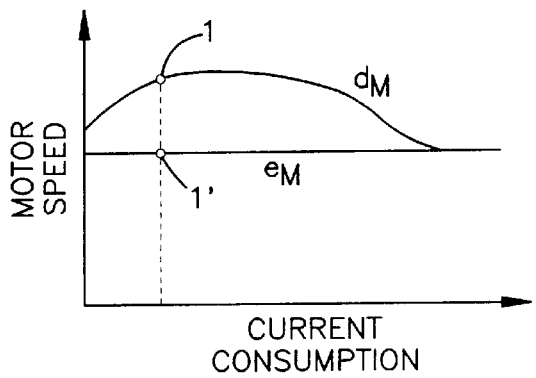
FIG. 4 shows a motor speed/current consumption diagram.

The corresponding qualitative course of the motor characteristics is shown in FIG. 4. Characteristic $e_M$ describes the course of the motor speed as a function of the current consumption of a motor operated at constant speed. Characteristic $d_M$ describes a controlled motor characteristic. Positions 1 and 1' in FIG. 1 correspond to the speed values 1 and 1' of the electric motor in FIG. 4. The increase in the speed of characteristic $d_m$ compared to $e_m$, which permits a change of characteristic (e) to characteristic (d) in FIG. 1, may be clearly seen.

The method for speed control described here is not limited to the application described in FIG. 1; other meaningful valve characteristics can of course also be produced. This is an additional advantage, particularly since the steering valve needs to be only slightly modified at the control edges. The inventive method thus provides high flexibility in the valve characteristic with a simultaneous high degree of standardization of the steering valve. The power-assisted steering system requires practically no additional components.

| List of Reference Symbols | |
| --- | --- |
| V | traveling speed |
| a | steering characteristic at high volumetric flow |
| b | steering characteristic at moderate volumetric flow |
| c | steering characteristic at low volumetric flow |
| d | steering characteristic with variation of motor speed |
| e | steering characteristic at constant motor speed |
| $d_M$ | motor characteristic with variation of motor speed |
| $e_M$ | motor characteristic, constant motor speed |
| t | dead band of valve characteristic |
| $t_1$ | dead band of valve characteristic at high volumetric flow |
| $t_2$ | dead band of valve characteristic at moderate volumetric flow |
| $t_3$ | dead ban of valve characteristic at low volumetric flow |
| $t_4$ | dead band of the valve characteristic |
| $t_5$ | dead band of the valve characteristic |
| 1 | working point of a controlled valve characteristic and motor charactetistic |
| 1' | working point of an uncontrolled valve characteristic and motor characteristic |

What is claimed is:

1. A method of controlling a motor vehicle power steering system having a hydraulic power steering motor, a steering valve actuatable to control fluid flow to the steering motor, a hydraulic pump for directing hydraulic fluid to the steering valve, and an electric motor for driving the hydraulic pump, said method comprising the steps of:

storing in a memory values of current consumption for the electric motor and setpoint speed for the electric motor at the respective values of current consumption, the values for the setpoint speed are determined such that the value of the torque at which power assistance starts is settable;

continuously measuring the actual speed of the electric motor and actual current consumption of the electric motor;

comparing the actual speed of the electric motor with the stored setpoint speed of the electric motor at a respective actual current consumption value of the electric motor;

determining a deviation of the actual speed and the stored setpoint speed of the electric motor at the respective actual current consumption value; and in the event of a deviation changing the actual speed of the electric motor value to the stored setpoint speed value for the electric motor.

2. The method of claim 1 further comprising the step of:

determining the values for the setpoint speed of the electric motor such that a differential pressure to torque relationship of the steering valve is linear.

3. The method of claim 2 further comprising the steps of:

using a steering angle sensor to determine a steering angle of the steering valve, and defining the values for the setpoint speed of the electric motor based on asymmetries of the steering valve affecting a differential pressure to torque relationship during steering in a right direction versus steering in a left direction such that at least a partial correction of the asymmetries is effected.

4. The method of claim 1, the step of storing in a memory further being defined by the step of:

storing the values for the current consumption and the setpoint speed of the electric motor in an electric memory.

5. The method of claim 4 further comprising the step of:

reading the values for the current consumption and the setpoint speed of the electric motor into the electronic memory during operation of the system.

6. The method of claim 1 further comprising the steps of:

calculating the values for the setpoint speed of the electric motor based on tolerance deviations of a force of the hydraulic power steering motor of the system, and defining the setpoint speed of the electric motor such that at least a partial correction of the hydraulic power steering motor force is effected.

7. The method of claim 1 further comprising the step of:

calculating the values for the setpoint speed of the electric motor based on tolerance deviations of a differential pressure to torque relationship of the steering valve, and defining the setpoint speed of the electric motor such that at least a partial correction of the differential pressure to torque relationship is effected.

8. The method of claim 1, the step of changing the actual speed of the electric motor value to the stored setpoint speed value for the electric motor further comprising the step of:

changing the actual speed of the electric motor value by means of pulse width modulation processes.

9. The method of claim 1 further comprising the steps of:

storing in memory values for the setpoint speed of the electric motor as related to a respective traveling speed value for a motor vehicle having the system;

continuously measuring the traveling speed of the motor vehicle having the system;

comparing the actual speed of the electric motor with the stored setpoint speed of the electric motor at a respective traveling speed value of the motor vehicle;

determining a deviation of the actual speed and the stored setpoint speed of the electric motor at the respective traveling speed value; and in the event of a deviation changing the actual speed of the electric motor value to the stored setpoint speed value for the electric motor.

* * * * *